(12) United States Patent
Miyaji et al.

(10) Patent No.: US 6,493,390 B2
(45) Date of Patent: *Dec. 10, 2002

(54) MOTION COMPENSATION IMAGE ENCODING DEVICE

(75) Inventors: Satoshi Miyaji, Tokyo; Shuichi Matsumoto, Kunitachi, both of (JP)

(73) Assignee: Kokusai Denshin Denwa Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 30 days.

(21) Appl. No.: 09/162,475

(22) Filed: Sep. 28, 1998

(65) Prior Publication Data

US 2002/0015446 A1 Feb. 7, 2002

(30) Foreign Application Priority Data

Oct. 2, 1997 (JP) ............................................. 9-284265

(51) Int. Cl.[7] .................................................. H04B 1/66
(52) U.S. Cl. .................................................. 375/240.16
(58) Field of Search ...................... 375/240.12; 348/420, 348/416, 405, 400.1, 395; 382/251

(56) References Cited

U.S. PATENT DOCUMENTS

| | | | |
|---|---|---|---|
| 5,128,756 A | * | 7/1992 | Johnston et al. ........ 375/240.12 |
| 5,245,427 A | * | 9/1993 | Kunihiro .................. 348/400.1 |
| 5,294,974 A | * | 3/1994 | Naimpally et al. .......... 348/395 |
| 5,333,012 A | * | 7/1994 | Singhal et al. .............. 348/405 |
| 5,724,100 A | * | 3/1998 | Kuchibhotla ................ 348/420 |
| 6,188,798 B1 | * | 2/2001 | Lee ............................ 382/251 |

* cited by examiner

*Primary Examiner*—Chris Kelley
*Assistant Examiner*—Allen Wong
(74) *Attorney, Agent, or Firm*—Lackenbach Siegel, LLP

(57) ABSTRACT

A motion detecting device for enhancement of the image quality at ultra-low bit rates is disclosed, which permits quantization of the prediction error with the highest possible degree of accuracy, taking into account the amount of information which is generated by a motion vector generated by a motion vector generator. A difference vector corresponding to a difference between the motion vector and a motion vector of an already encoded reference pixel block located near the current pixel block to be encoded in said current frame is obtained. An output resulting from a motion detection of the difference vector so as to obtain the minimum step size from said difference vector, through the use of the number of generated bits and the number of bits of said difference vector, is encoded.

6 Claims, 8 Drawing Sheets

RELATION BETWEEN SUM OF ABSOLUTE DIFFERENCE AND GENERATED INFORMATION QUANTITY

RELATION BETWEEN SUM OF ABSOLUTE DIFFERENCE AND GENERATED INFORMATION QUANTITY

MOTION COMPENSATION IMAGE ENCODING DEVICE

BACKGTOUND OF THE INVENTION

The present invention relates to a motion compensation image encoding device which performs motion compensation and encodes and transmits a motion vector and its prediction error.

For the purpose of application, for example, to mobile video communications by the PCS and portable telephone systems and monitor image transmissions over telephone circuits as well as to a dynamic image transmission on the Internet, there is a demand for a high-quality image compression technique that achieves an ultra-low bit rate below 20 kbps as a video rate.

In this field, too, the most popular image compression technique is one that utilizes a motion compensation DCT (Discrete Cosine Transform) system as typified by ITU-T Recommendation H. 263. Conventional motion compensation systems perform motion detection from a viewpoint of minimizing a prediction error, and transmit a motion vector and the prediction errors in coded form.

In conventional ultra-low bit rate image coding scheme typified by Recommendation H. 263, the motion detection takes place through block matching which is carried out for each macro block. For example, TMN5 takes into account the precedence of zero vector but basically involves vector detection intended to minimize the prediction error.

FIG. 10 is a block diagram depicting an example of a conventional motion compensation image encoding device, in which image signals input via an input terminal 1 are sequentially stored in a current frame memory 2 and a previous frame (reference frame) memory 3. A motion vector from a motion vector generator 4 is provided to a motion compensation circuit 5, wherein it is used for motion compensation of a previous frame signal from the previous frame (reference frame) memory 3, then a difference between a current frame signal from the current frame memory 2 and its motion-compensated output is detected by a subtractor 6, and the difference is fed to an encoder 26 and a motion prediction error detector 21. A minimum prediction error decision circuit 22 decides a minimum prediction error based on the motion vector fed from the motion vector generator 4 and the motion prediction error from the motion prediction error detector 21. This minimum prediction error is delayed, for example, by a one-block delay circuit 23 and is stored, as a next left block, in a motion vector memory 24, and a difference motion vector, which corresponds to a difference between the minimum prediction error and an output from the motion vector memory 24, is obtained by a substracter 25 and provided to an encoder 27.

That is, letting $x_t(i, j)$ and $x_{t-1}(i, j)$ represent pixel values of current and previous frames, respectively, a value SAD (Sum of Absolute Differences) is given by the following equation (1).

$$SAD = \sum_j \sum_i |x_t(i, j) - x_{t-1}(i + mv_x, j + mv_y)| \quad (1)$$

The motion vectors $mv_x$ and $mv_y$ which minimize the value SAD are detected for each macro block.

At medium to high bit rates above 100 kbps, the amount of information about the motion vector is substantially negligible as compared with the amount of information on the prediction difference signal; hence, the minimization of the value SAD is a key factor in the quantization of the prediction error signal with the highest precision.

In the motion detection at ultra-low bit rates, however, the proportion of the amount of motion vectors to a current bit rate increases. Table 1 shows respective occupation of bit rates and the proportions of the motion vectors in an image "Carphone."

TABLE 1

Relationships between the bit rates and the amount of information of the motion vector

| Bit Rate | Motion vector |
| --- | --- |
| 10 kbps | 40.8% (815 bits) |
| 20 kbps | 20.4% (816 bits) |
| 50 kbps | 7.8% (776 bits) |
| 100 kbps | 3.8% (769 bits) |
| 200 kbps | 1.9% (769 bits) |

The frame rate is fixed at 5 fps, and the number of motion vector bits is a mean value for each processed frame. From this table, it is understandable that the number of geberated bits from the motion vector is substantially constant irrespective of the bit rate. Accordingly, as the bit rate decreases, the proportion of the motion vector increases; the latter exceeds 20% at ultra-low bit rates below 20 kbps.

As described above, the conventional motion compensation image encoding device performs the motion detection by block matching so that the power (square sum) of the prediction error block or its value SAD is minimized.

In the conventional device, the current frame is divided into blocks, and for each block, a position where the square sum or the value SAD of an error (a prediction error) relative to an immediately previous frame (a reference frame) stored in the frame memory is minimized is detected in the range of search, and the position detected is used as a motion vector.

In the actual motion vector transmission, a difference between the motion vector of each block and that of the left or upper block is sent since the motion vector has a strong correlation to the neighboring blocks.

The prior art makes the motion detection solely for the purpose of minimizing the prediction error as mentioned above, and hence it does not ever take into consideration the amount of information on the motion vector. On this account, no sufficient amount of information is assigned to the motion prediction error, so that the quantization step size for the motion prediction error increases, inevitably incurring the degradation of the image quality.

SUMMARY OF THE INVENTION

An object of the present invention is to provide a motion compensation image encoding device which obviates the problems of the prior art and, for enhancement of the image quality at ultra-low bit rates, permits quantization of the prediction error with the highest possible degree of accuracy, taking into account the amount of information generated from the motion vector.

To attain the above object, the motion compensation image encoding device according to the present invention comprises:

first encoding means for encoding motion prediction error information corresponding to a difference between an image signal of a current frame and a compensated output of an image signal of a reference frame preceding the current frame, obtained by motion-compensation by the use of a motion vector generated by a motion vector generator; and second encoding means for obtaining a difference vector corresponding to a difference between said motion vector and a motion vector of an already encoded reference pixel block located near the current pixel block to be encoded in said current frame, and for encoding an output resulting from motion detection of said difference vector so as to obtain the minimum step size from said difference vector, through the use of the number of bits generated, which is estimated from the magnitude of a motion prediction error contained in said motion prediction error information, and the number of generated bits of said difference vector.

BRIEF DESCRIPTION OF DRAWINGS

The present invention will be described in detail below with reference to accompanying drawings, in which.

DETAILED DESCRIPTION

In the motion compensation encoding system according to the present invention, the motion prediction error can be decreased by enlarging the range of detection and by detecting pixels with high accuracy. On the other hand, increased accuracy of the motion detection causes an increase in variations of motion vectors, increasing the amount of information generated by the motion vector.

Such a relationship between the amount of information of the motion vector and the amount of information of the prediction error, in one macro block, is given by the following equation (2).

$$B_{MB} = VLC(Dmv_x) + VLC(Dmv_y) + f(SAD, Q) \quad (2)$$

In the above, $VLC(Dmv_x)$ and $VLC(Dmv_y)$ are code length of VLC (Variable Length Code) of difference motion vectors in the $\underline{x}$ and $\underline{y}$ directions, respectively, and the function f(SAD, Q) is the number of bits which are produced when the sum of absolute differences SAD between the motion vectors $mv_x$ and $mv_y$ is quantized using a step size Q.

Since the number of bits assigned to each macro block is constant irrespective of the motion vector value, the quantization of the macro block with the highest degree of accuracy requires the detection of a motion vector which minimizes the step size Q in Eq. (2).

Figure 6:
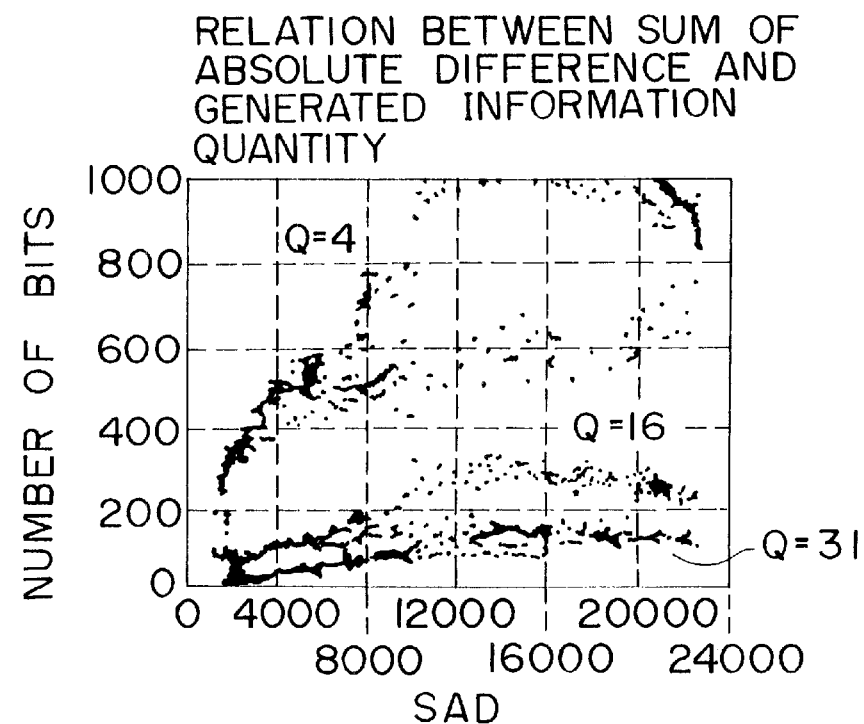
FIG. 6 is a graph of measurements showing the relationships between the sum of absolute differences and the amount of generated information which are handled in the present invention.
Figure 7:
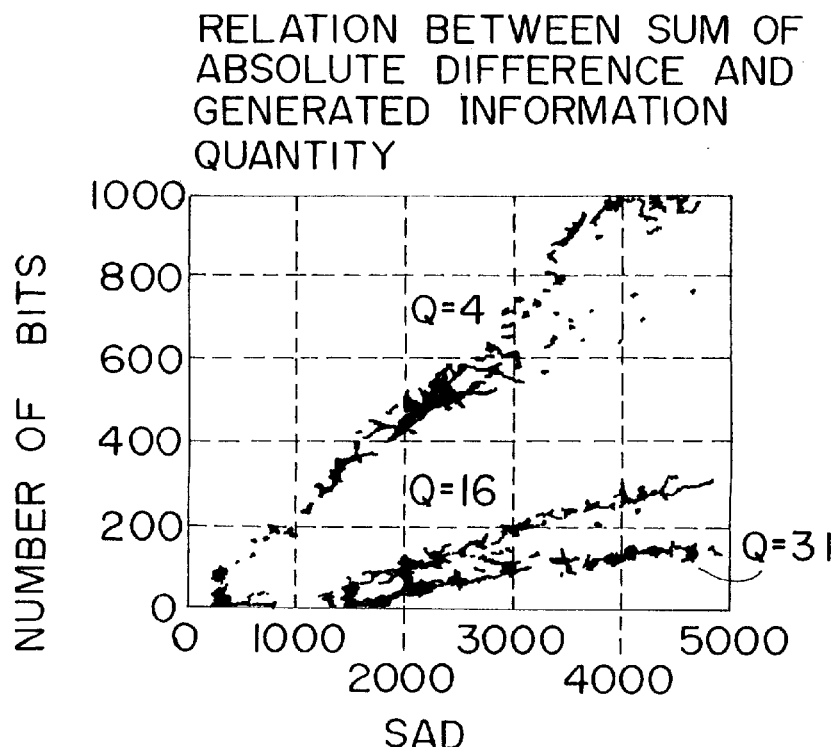
FIG. 7 is a graph of measurements showing the relationships between the sum of absolute differences in the DCT domain and the amount of generated information which are handled in the present invention.

To find the property of the function f, the relationships between the sum of absolute differences, SAD, of prediction errors calculated over the entire range of motion detection for each macro block and the number of bits generated by quantizing the value SAD with the step size Q were derived from real images; these relationships are shown in FIGS. 6 and 7. It is evident from FIGS. 6 and 7 that there is a meaningfull correlation between the value SAD and the number of bits generated, but the latter varies greatly with respect to the value SAD in the image domain. On the other hand, these figures demonstrate that the number of bits generated does not greatly vary with respect to the value SAD calculated in the DCT domain, and hence it can be predicted with high accuracy. This is considered to be attributable to the fact that the quantization of the motion compensation error is carried out after DCT.

Based on the above, the function $\underline{f}$ in Eq. (2) can be approximated by the following equation (3) using α and β as constants.

$$f(SAD, Q) = \frac{\alpha}{Q} SAD_{DCT} + \beta \quad (3)$$

Accordingly, a motion detection evaluation function, which is used to provide the minimum step size for each macro block, is such as given by the following equation (4) based on Eqs. (2) and (3), and the motion vector which provides the maximum evaluation value E is the optimum point.

$$E = \frac{B_{MB} - \{VLC(Dmv_x) + VLC(Dmv_y)\} - \beta}{SAD_{DCT}} \quad (4)$$

Since this evaluation function E is $B_{MB} - [VLC(Dmv_x) + VLC(Dmv_y)] \approx B_{MB}$ at high bit rates where the proportion of vector is small, the motion vector which provides the maximum evaluation value E is one minimizes $SAD_{DCT}$, that is, SAD.

PREFERED EMBODIMENTS

Figure 1:
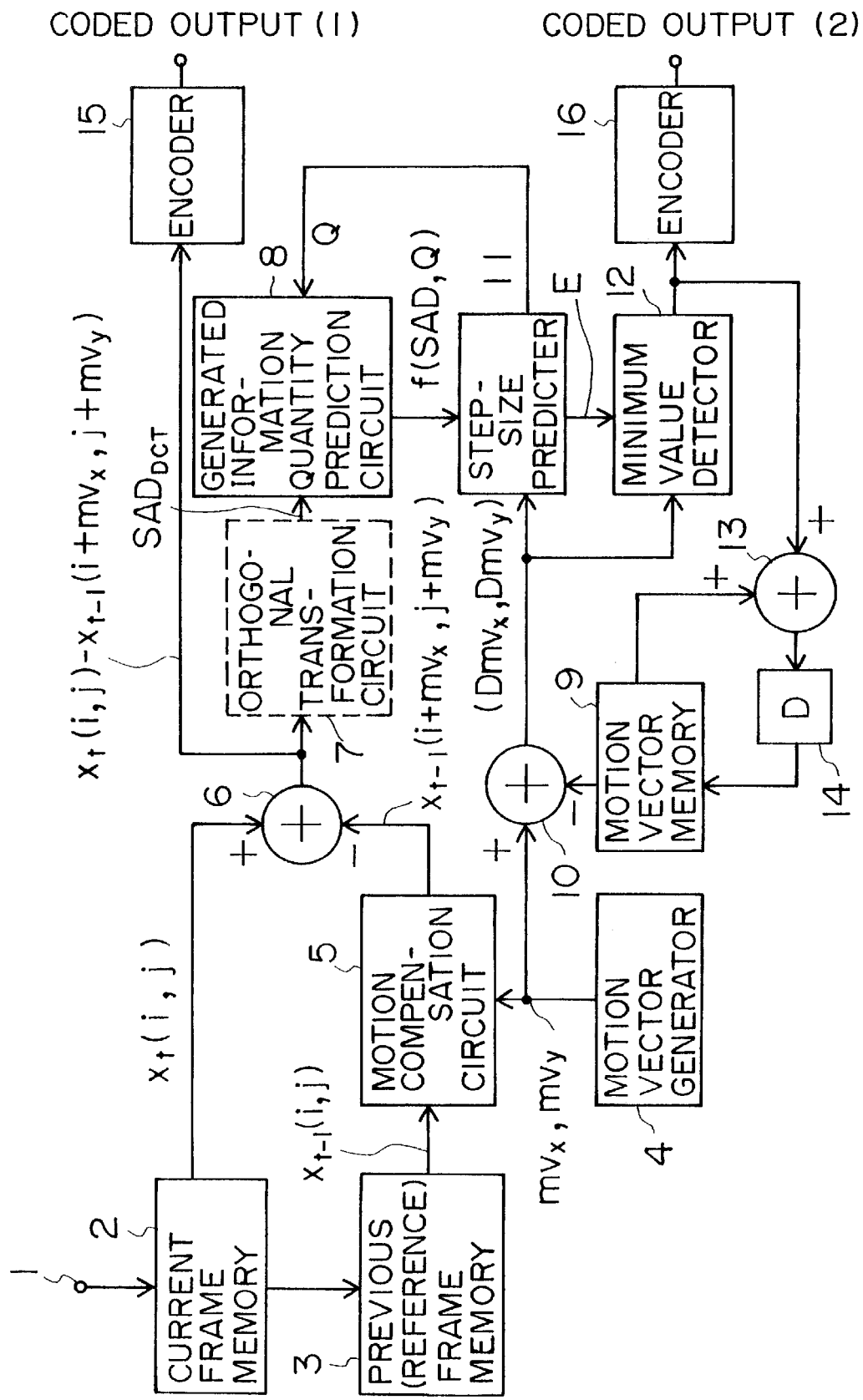
FIG. 1 is a block diagram illustrating an embodiment of the present invention.
Figure 10:
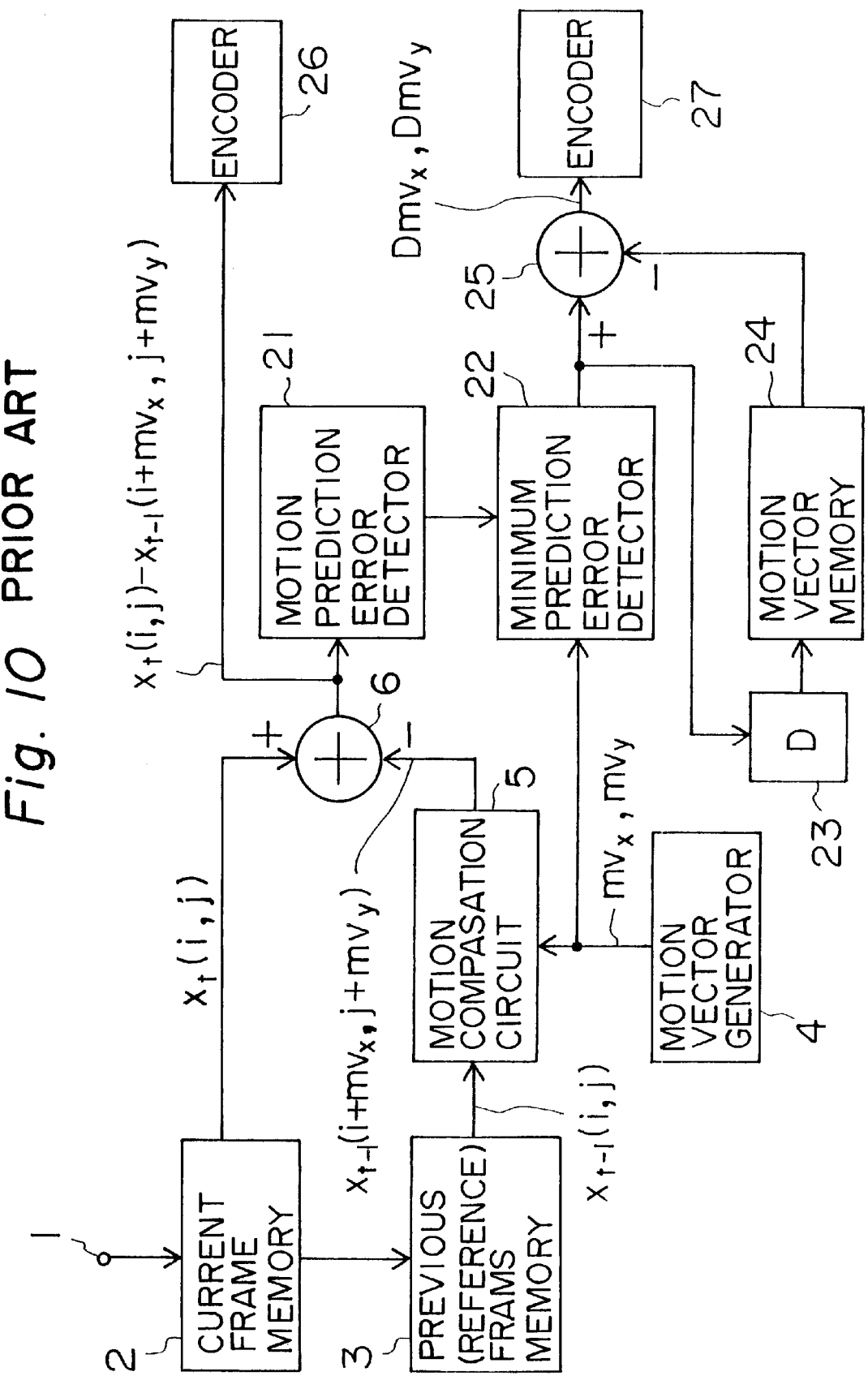
FIG. 10 is a block diagram illustrating an example of a conventional motion compensation encoding system.

FIG. 1 illustrates in block form an embodiemnt of the present invention, in which the input terminal 1, the current frame memory 2, the previous frame (reference frame) memory 3, the motion vector generator 4, the motion compensation circuit 5 and the substractor 6 are the same as those used in the prior art example depicted in FIG. 10.

An orthogonal transformation circuit 7 is used as required, from which is provided an orthogonal transformation output produced by subjecting the motion prediction error information from the subtrator 6 to orthogonal transformation such as DCT, Hadamard transformation or Fourier transformation. The orthogonal transformation output ($SAD_{DCT}$, for instance) is fed to a generated information-quantity prediction circuit 8, which generates an output indicative of the aforementioned function f(SAD, Q) corresponding to a generated information-quantity prediction value.

Figure 2A:
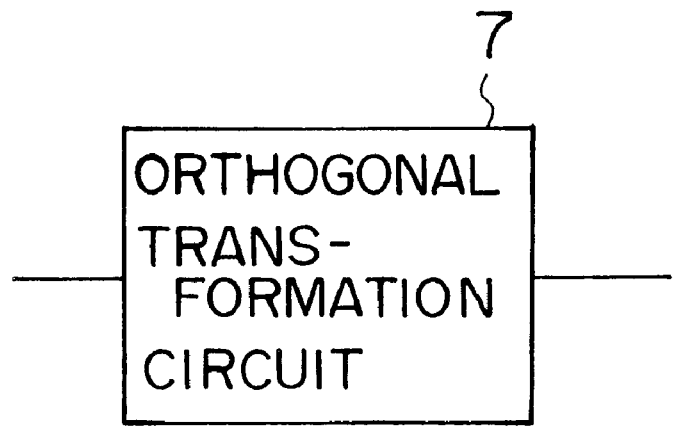
FIG. 2 is a block diagram depicting an example of a circuit in place of an orthogonal transformation circuit for use in the present invention.
Figure 2B:
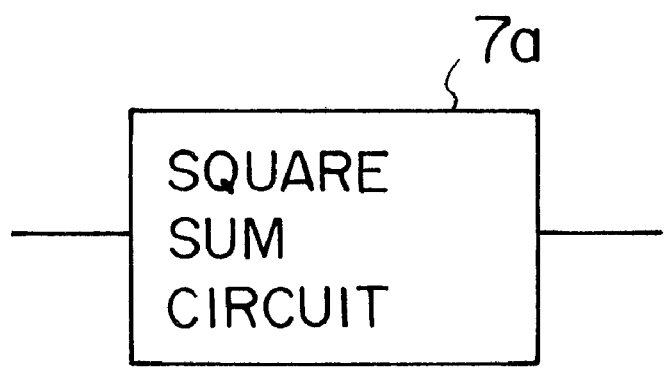
Figure 2C:
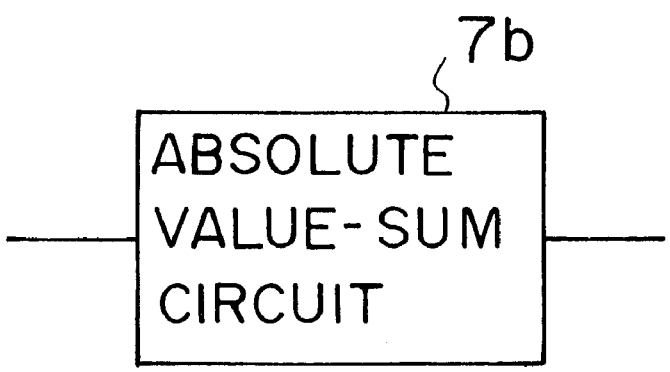

Such an orthogonal transformation as shown in FIG. 2A may be replaced with a transformation which obtains an absolute value-sum by an absolute-sum circuit 7a as shown in FIG. 2B or a square sum by a square sum circuit 7b as depicted in FIG. 2C.

A difference vector, which corresponds to a difference between the motion vector from the motion vector generator 4 and the motion vector from the motion vector memory 9, is provided from the subtractor 10.

This difference vector is used to make a step size prediction in a step-size predictor 11, then the resulting prediction value is used to choose a difference vector by a minimum value detector 12 so that the predicted step size is minimized, and the difference vector is fed to and encoded by an encoder 16. The motion vector read out of the motion vector memory 9 is added by an adder 13 to the output from the minimum value detector 12, and the added output is delayed by a delay circuit 14 for a predetermined period of time and is then stored as an updated motion vector in the motion vector memory 9.

Figure 3:
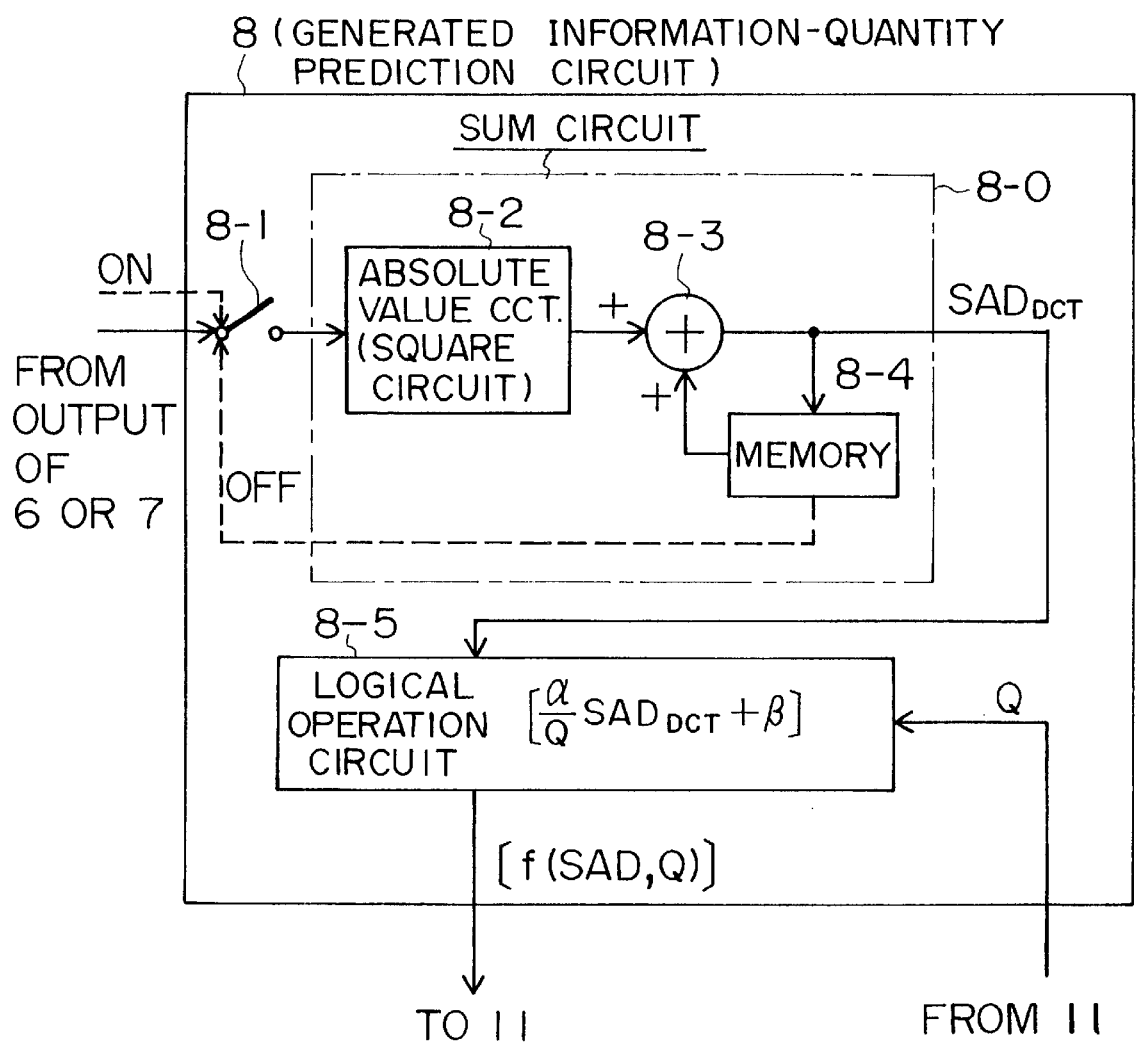
FIG. 3 is a block diagram showing an example of a generated information-quantity prediction circuit for use in the present invention.

FIG. 3 illustrates an example of the generated information-quantity prediction circuit 8; the output from the substractor 6 or the orthogonal transformation circuit 7 is applied to a switch 8-1. The switch 8-1 is turned ON by a timing pulse which is generated upon each readout of the block from the aforementioned memory 2 or 3. Reference numeral 8-2 denotes an absolute value circuit or a square circuit, 8-3 an adder and 8-4 a memory; the circuits 8-2, 8-3 and 8-4 constitute a sum circuit 8-0. In case of using the square sum circuit 7a or the absolute value-sum circuit 7b in place of the orthogonal transformation circuit 7 as described previously with reference to FIG. 2, the sum circuit 8-0 is omitted. The output $SAD_{DCT}$ from the sum circuit 8-0 is provided to a logical operation circuit 8-5, wherein an operation $[\alpha/Q(SAD_{DCT}+\beta)]$ is performed using the step size Q from the step-size predictor 11 and from which an output corresponding to the function f(SAD, Q) is taken out and applied to the step-size predictor 11.

Figure 4:
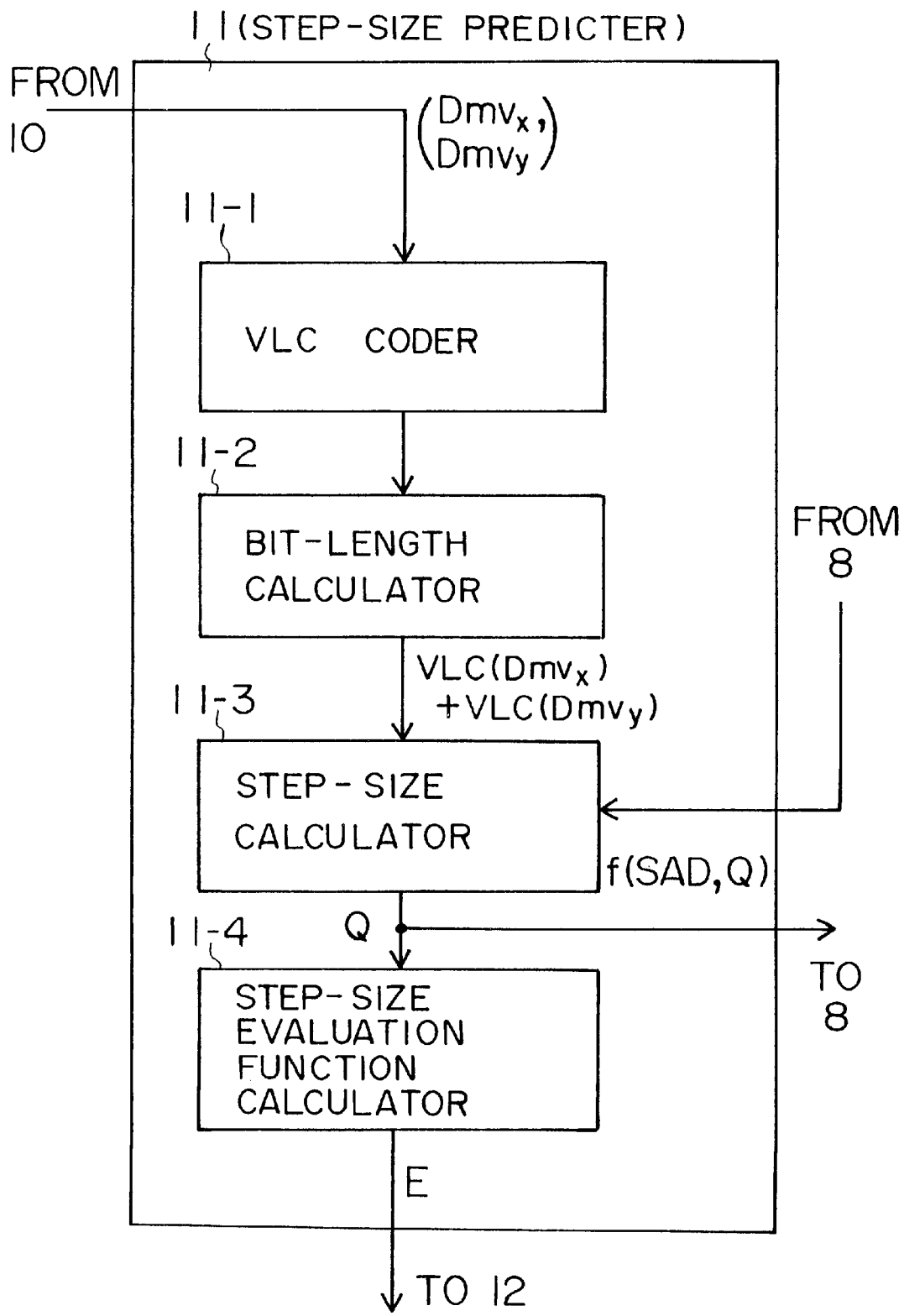
FIG. 4 is a block diagram depicting an example of a step-size predictor for use in the present invention.

FIG. 4 shows an example of the step-size predictor 11, in which the difference motion vector ($Dmv_x$, $Dmv_y$) from the adder 10 is coded by a VLC coder 11-1 into a VLC code, which is then coded by a bit-length calculator 11-2 into a bit-length signal VLC($Dmv_x$)+VLC($Dmv_y$). This bit-length signal is applied to a step-size calculator 11-3, wherein a signal representative of the function f(SAD, Q) from the generated information-quantity prediction circuit 8 is used to calculate the step size Q, which is fed to the generated information-quantity prediction circuit 8. The step size Q is converted by a step-size evaluation function calculator 11-4 into the step size evaluation function E, which is provided to the minimum value detector 12.

Figure 5:
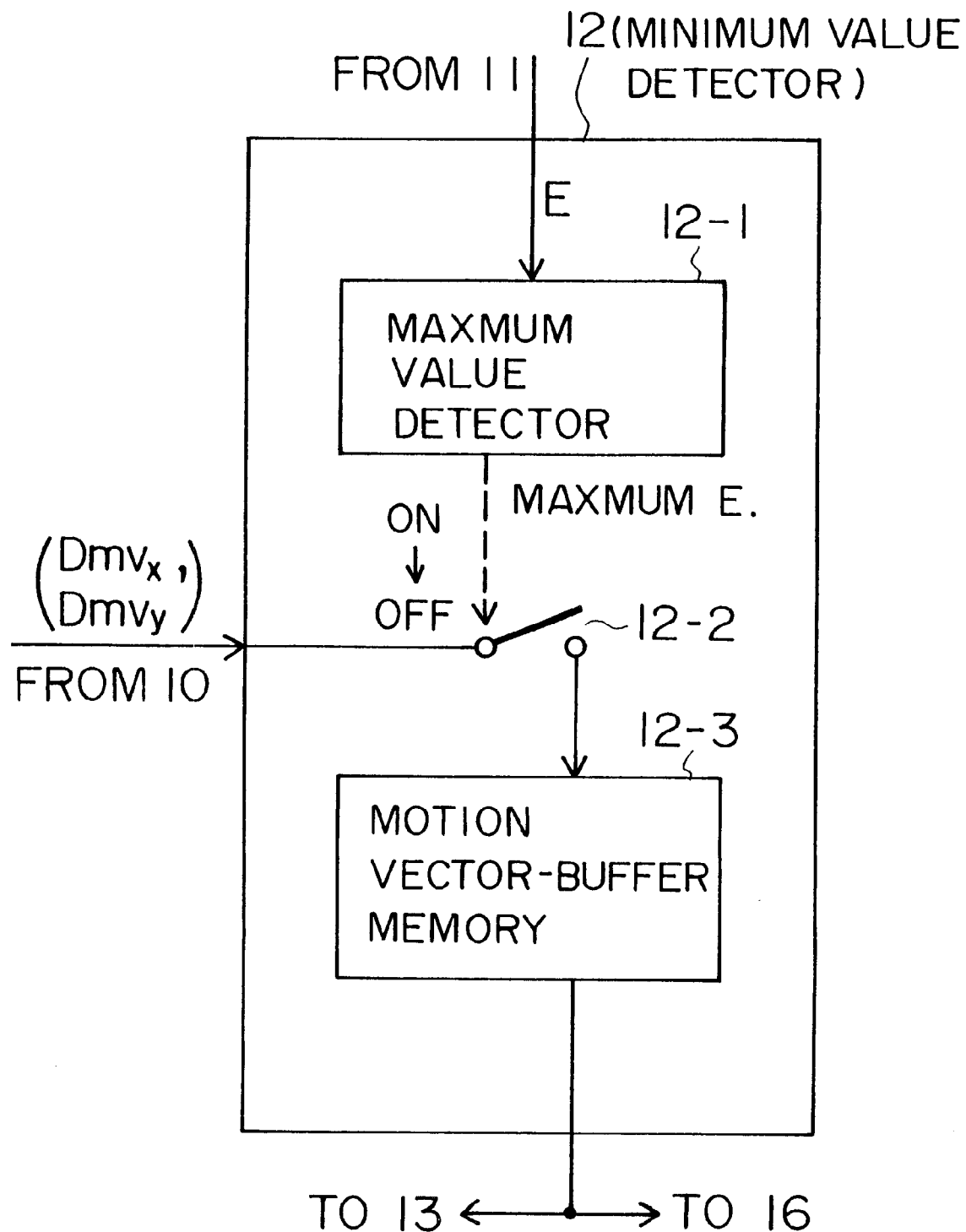
FIG. 5 is a block diagram showing an example of a minimum value detector for use in the present invention.

FIG. 5 illustrates an example of the minimum value detector 12, wherein the maximum value of the step size evaluation function E is detected by a maximum value detector 12-1, and a switch 12-2 is held-ON by the detected output for an extremely short time but returns again to the OFF state. While the switch 12-2 is the ON-state, the difference motion vector ($Dmv_x$, $Dmv_y$) from the subtractor 10 is fed as the minimum value of the difference motion vector to the encoder 16 and the adder 13.

Figure 8:
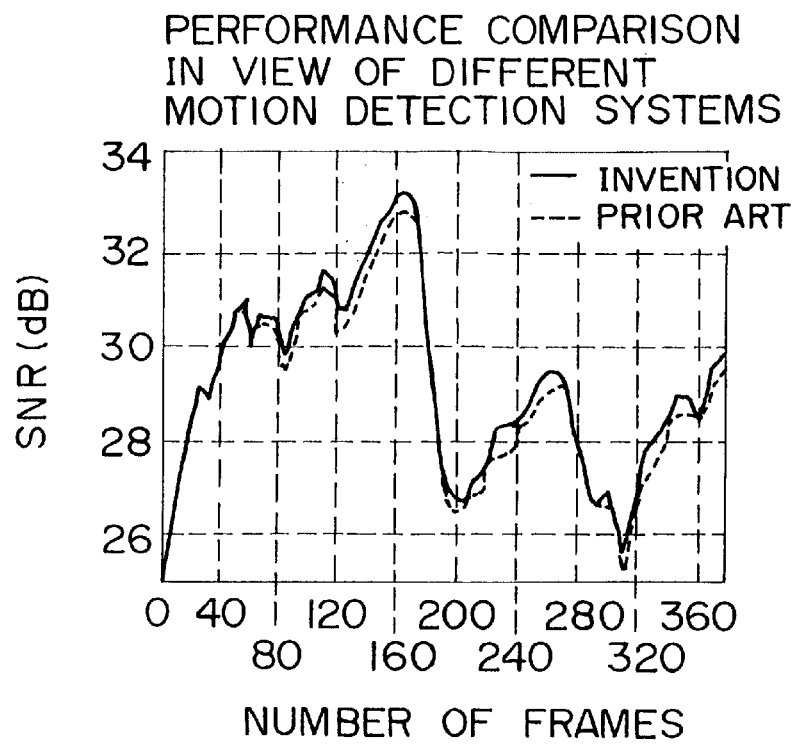
FIG. 8 is a graph of measurements depicting the results of comparison in performance between the present invention and the prior art by a motion detection system.
Figure 9:
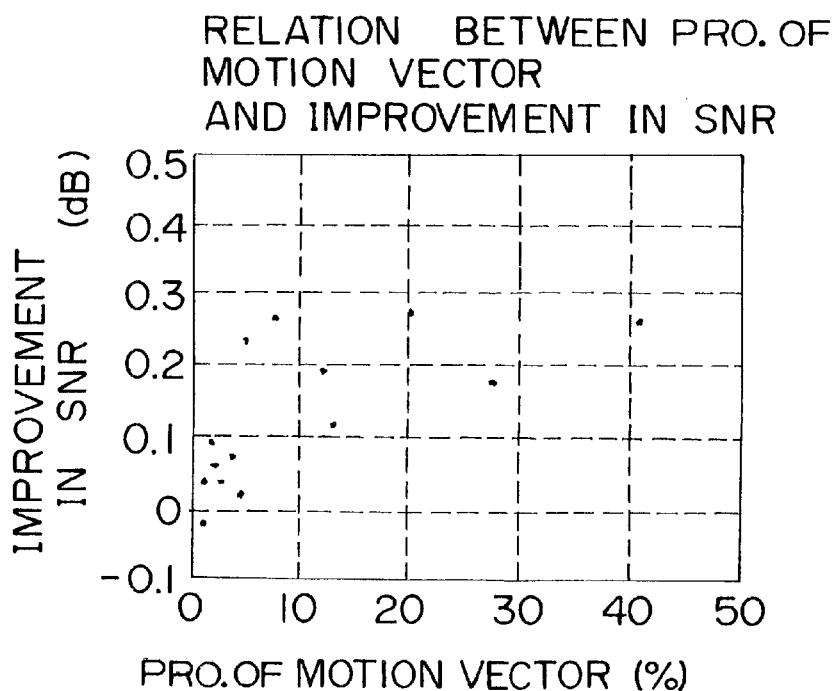
FIG. 9 is a graph illustrating the relationship between the proportion of the motion vector obtained by a conventional motion detection system and improvements in SNR values obtained by the present invention.

For performance evaluations of the scheme according to the present invention, simulations were done by H.263TMN5. The frame rate was fixed at 5 fbp and the coding bit rate was set at 10 kbps, 20 kbps, 50 kbps, 100 kbps and 200 kbps. In FIG. 8 there are shown the simulation results obtained on a QCIF image "Carphone" at 20 kbps. In FIG. 9 the relationships between the proportion of the motion vector obtained by the conventional motion detection intended to minimize the prediction error and improvements in SNR values obtained by the present invention are depicted in respect of a total of 15 values obtained by encoding three test images (carphone, susie, KDD original) at the abovementioned five bit rates. The proportion of the motion vector and the improved SNR value are mean values throughout the sequence.

According to FIG. 8, the SNR by the present invention are better than those by the conventional system over the entire area of the scene, and reaches a maximum of 0.5 dB. The proportion of the motion vector present in this image is 20.4% per scene in the conventional system but 12.3% in the present invention. The conventional motion detection system is employed with a view to minimizing the prediction error; hence, at ultra-low bit rates below 20 kbps, the situation may sometimes arise where the number of bits of the motion vector increases relative to the number of bits assigned to the quantization of the prediction error and makes the latter unaptly small. On the other hand, the use of the present invention permits an 8.1% reduction of the proportion of the motion vector. By assigning this surplus proportion to the quantization of the prediction error, the SNR could be improved.

According to FIG. 9, the higher the proportion of the vector bits, the more the SNR is improved by the present invention. Further, the SNR improving effect greatly differs, depending on whether the proportion of the vector is above or below 5%. This confirms that the present invention is effective in improving the picture quality at ultra-low bit rates above 5% and that the present invention covers the conventional system at high bit rates where the proportion of the motion vector decreases.

As described above in detail, it has been confirmed that the motion detection scheme according to the present invention, which minimizes the quantization step size for the prediction error based on the estimation of the number of quantization bits and the motion-vector bit length, is effective at ultra-low bit rates where the proportion of the motion vector increases. Moreover, it has been clarified that the influence of the motion vector length on the quantization depends on whether the proportion of the vector is above or below 5%. From such points of view, the present invention is highly effective and of great utility when employed in the image information transmission field.

What we claim is:

1. A motion compensation image encoding device comprising:

first encoding means for encoding motion prediction error information corresponding to a difference between an image signal of a current frame and a motion compensated output of an image signal of a reference frame preceding the current frame, obtained by motion-compensation by the use of each motion vector generated by a motion vector generator; and second encoding means comprising: auxiliary first means for obtaining a difference vector corresponding to a difference between said motion vector and an updated motion vector of an already encoded reference pixel block located near a current pixel block to be encoded in said current frame, auxiliary second means for obtaining the number of first generated bits, which is estimated from the magnitude of a motion prediction error contained in said motion prediction error information, auxiliary third means for obtaining a detected output resulting from evaluation of said difference vector so as to obtain the minimum step size for encoding said current pixel block, through the use of the number of first generated bits and a number of second generated bits of said difference vector, and auxiliary forth means for encoding said detected output.

2. A motion compensation image encoding device comprising:

first encoding means for encoding motion prediction error information corresponding to a difference between an image signal of a current frame and a compensated output of an image signal of a reference frame preceding the current frame, obtained by motion-compensation by the use of each motion vector generated by a motion vector generator; and second encoding means for obtaining a difference vector corresponding to a difference between said motion vector and an updated motion vector of an already encoded reference pixel block located near a current pixel block to be encoded in said current frame, and for encoding an output resulting from evaluation of said difference vector so as to obtain the minimum step size for encoding said current pixel block, through the use of the number of generated bits, which is estimated from the magnitude of a motion prediction error contained in said motion prediction error information, and the number of generated bits of said difference vector;

said second encoding means comprising:

estimating means for estimating, by the use of a step size, the number of generated bits obtainable by encoding said current pixel block from the magnitude of the motion prediction error contained in said motion prediction error information;

a motion vector memory for storing each motion vector of said reference pixel block;

a subtractor for taking out said difference vector corresponding to the difference between said motion vector from said motion vector generator and said motion vector from said motion vector memory;

a step-size predictor generating a step size evaluation function for predicting and evaluating the step size from the number of generated bits obtained from said estimating means and said difference vector obtained from said subtractor;

a minimum value detector for selecting values of said difference vector, in case of a maximum value of said size evaluation function obtained from said step size predictor, said maximum value of said step size evaluation function corresponding to a minimum quantization step for encoding said current pixel block; and an encoder for encoding said selected difference vector obtained from said minimum value detector.

3. A motion compensation image encoding device according to claim 2, in which said estimating means has a circuit for estimating the number of generated bits of said motion prediction error from the sum of absolute differences in a prediction error block.

4. A motion compensation image encoding device according to claim 2, in which said estimating means has a circuit for estimating the number of generated bits of said motion prediction error from a square sum in a prediction error block.

5. A motion compensation image encoding device according to claim 2, in which said estimating means has a circuit for estimating the number of generated bits of by said motion prediction error from the sum of absolute differences after orthogonal transformation of a prediction error block.

6. A motion compensation image encoding device according to claim 2, in which said estimating means has a circuit for estimating the number of generated bits of by said motion prediction error from a square sum after orthogonal transformation of a prediction error block.

* * * * *